United States Patent
Yang et al.

(10) Patent No.: US 12,448,290 B2
(45) Date of Patent: Oct. 21, 2025

(54) METHOD FOR PRODUCING TETRAFLUOROMETHANE THROUGH PLASMA PYROLYSIS OF WASTE POLYTETRAFLUOROETHYLENE

(71) Applicants: ZHEJIANG UNIVERSITY, Zhejiang (CN); ZHEJIANG JUHUA NEW MATERIAL RESEARCH INSTITUTE CO., LTD., Zhejiang (CN)

(72) Inventors: Qiwei Yang, Zhejiang (CN); Wenjun Zhang, Zhejiang (CN); Qilong Ren, Zhejiang (CN); Liyang Zhou, Zhejiang (CN); Shuhua Wang, Zhejiang (CN); Wei Qin, Zhejiang (CN); Hongfeng Li, Zhejiang (CN); Zhiguo Zhang, Zhejiang (CN); Zongbi Bao, Zhejiang (CN); Baogen Su, Zhejiang (CN)

(73) Assignees: ZHEJIANG UNIVERSITY, Zhejiang (CN); ZHEJIANG JUHUA NEW MATERIAL RESEARCH INSTITUTE CO., LTD., Zhejiang (CN)

(*) Notice: Subject to any disclaimer, the term of this patent is extended or adjusted under 35 U.S.C. 154(b) by 0 days.

(21) Appl. No.: 18/856,520

(22) PCT Filed: Jan. 25, 2024

(86) PCT No.: PCT/CN2024/073919
§ 371 (c)(1),
(2) Date: Oct. 11, 2024

(87) PCT Pub. No.: WO2025/030788
PCT Pub. Date: Feb. 13, 2025

(65) Prior Publication Data
US 2025/0171306 A1  May 29, 2025

(30) Foreign Application Priority Data

Aug. 7, 2023 (CN) .......................... 202310984261.0

(51) Int. Cl.
*C01B 32/10* (2017.01)
*C08J 11/12* (2006.01)

(52) U.S. Cl.
CPC .............. *C01B 32/10* (2017.08); *C08J 11/12* (2013.01); *C08J 2499/00* (2013.01)

(58) Field of Classification Search
None
See application file for complete search history.

(56) References Cited

U.S. PATENT DOCUMENTS 4,128,589 A * 12/1978 Pastor .................... C30B 11/00
423/491
4,644,877 A * 2/1987 Barton .................... C10B 19/00
422/186.25

(Continued)

FOREIGN PATENT DOCUMENTS

| CN | 1108638 A | 9/1995 |
| CN | 101341202 A | 1/2009 |

(Continued)

OTHER PUBLICATIONS

Translation Artemov et al. RU 2504443; Jan. 2014.*

(Continued)

*Primary Examiner* — Guinever S Gregorio
(74) *Attorney, Agent, or Firm* — Chiesa Shahinian & Giantomasi PC

(57) ABSTRACT

Provided is a method for producing tetrafluoromethane through plasma pyrolysis of waste polytetrafluoroethylene (PTFE). The method includes: subjecting the waste PTFE to a plasma pyrolysis reaction to obtain a pyrolysis product, and subjecting the pyrolysis product to quenching and (Continued)

gas-solid separation in sequence to obtain a pyrolysis gas including the tetrafluoromethane, wherein the plasma pyrolysis reaction is performed at a temperature of 1,800 K to 5,000 K.

8 Claims, 8 Drawing Sheets

(56) References Cited

U.S. PATENT DOCUMENTS

| | | | | |
|---|---|---|---|---|
| 5,541,386 A | * | 7/1996 | Alvi | B01J 19/088 |
| | | | | 219/121.36 |
| 5,611,896 A | | 3/1997 | Swanepoel et al. | |
| 5,626,249 A | * | 5/1997 | Tylko | H01J 37/32055 |
| | | | | 219/121.36 |
| 8,212,091 B2 | | 7/2012 | Van Der Walt et al. | |
| 2019/0284476 A1 | * | 9/2019 | Gaber | C10B 53/07 |

FOREIGN PATENT DOCUMENTS

| | | | | |
|---|---|---|---|---|
| CN | 109734070 A | | 5/2019 | |
| CN | 117024245 A | | 11/2023 | |
| JP | H01180839 A | | 7/1989 | |
| JP | 2001300257 A | * | 10/2001 | |
| WO | WO-2004103938 A1 | * | 12/2004 | ............ C07C 17/367 |
| WO | WO-2005042629 A1 | * | 5/2005 | .............. C08F 14/26 |
| WO | WO-2014040634 A1 | * | 3/2014 | .............. C10K 1/028 |

OTHER PUBLICATIONS

Yang et al. (CN116947598) 2023.*
Xiao et al. (CN 109734070) 2019.*
International Search Report mailed Apr. 23, 2024, in connection with International Patent Application No. PCT/CN2024/073919, 7 pgs. (including translation).
Notification to Grant Patent Right for Invention mailed Apr. 23, 2024, in connection with Chinese Patent Application No. 202310984261.0, 3 pgs. (including translation).

* cited by examiner

METHOD FOR PRODUCING TETRAFLUOROMETHANE THROUGH PLASMA PYROLYSIS OF WASTE POLYTETRAFLUOROETHYLENE

This application is a National Stage under 35 U.S.C. 371 of International Patent Application No. PCT/CN2024/073919, filed Jan. 25, 2024, which claims priority under 35 U.S.C. 119 to the Chinese Patent Application 202310984261, filed Aug. 7, 2023; the disclosures of all of which are incorporated herein by reference in their entireties.

TECHNICAL FIELD

The present disclosure relates to the technical field of waste recycling, and in particular to a method for producing tetrafluoromethane through plasma pyrolysis of waste polytetrafluoroethylene (PTFE).

BACKGROUND

PTFE is the most widely-used fluorocarbon polymer with relatively-high chemical and thermal stability, wear resistance, and self-lubrication. PTFE, known as "plastic king", is mainly used in the petrochemical field, the electronic field, the electrical field, the mechanical field, and other fields. Synthesis, processing, secondary processing, and application processes of PTFE all will produce waste PTFE. How to treat and recycle the waste PTFE has attracted more and more attention.

Current recycling methods for waste PTFE mainly include mechanical crushing, radiation degradation, high-temperature pyrolysis, or the like. In the mechanical crushing method, a mechanical force is applied to a waste for occurring a mechanical change to obtain a powder with a relatively-small particle size. The mechanical crushing method does not have special requirements for a waste, and only requires a waste to be relatively pure and not include other substances, such that the excellent properties of the waste will not change when the waste is recycled. In the radiation degradation method, high-energy rays are adopted to overcome fluorocarbon bonds with high bond energy and break molecular chains of the fluorocarbon bonds, such that PTFE molecular chains undergo irregular breakage to obtain an ultra-fine PTFE powder. The radiation degradation method is not suitable for wastes including fillers such as glass fibers, copper powders, and molybdenum disulfide, because these fillers affect the color and particle size of a powder product during a radiation process. In the high-temperature pyrolysis method, PTFE is decomposed at a high temperature of 425° C. to 800° C. to produce a small molecule such as tetrafluoroethylene or hexafluoropropylene. At present, the pyrolysis of PTFE is mostly carried out in a tube furnace, a two-stage reactor, or a fluidized bed reactor, and requires a low pressure and a long residence time. Although pyrolysis products are mainly hexafluoropropylene and tetrafluoroethylene, by-products are generated at a considerable amount, such as octafluorocyclobutane, octafluoroisobutene, hexafluoroethane, octafluoropropane, and hexafluorobutyne, which results in the difficult separation and purification of a pyrolysis gas. In addition, tetrafluoroethylene undergoes polymerization at about 550° C. to produce tetrafluoroethylene polymers, which are easy to block a reactor and a material pipeline and thus reduce the thermal efficiency of the reactor. In order to maintain the reaction temperature, a greater energy input and equipment investment are required, which is not suitable for industrial scale-up.

Therefore, it is necessary to develop a method for treating waste PTFE and producing high-value gases, and the method should be suitable for continuous industrial scale-up and has no special requirements for wastes, so as to realize the resource utilization of waste PTFE. Tetrafluoromethane (R14) is a plasma etching gas with the largest consumption currently in the microelectronic industry, and has a broad development potential. Currently, there are few reports on the use of waste PTFE to prepare tetrafluoromethane.

SUMMARY

An object of the present disclosure is to provide a method for producing tetrafluoromethane through plasma pyrolysis of waste PTFE, which can efficiently convert waste PTFE into tetrafluoromethane and is suitable for industrial scale-up.

To achieve the above object of the present disclosure, the present disclosure provides the following technical solutions:

The present disclosure provides a method for producing tetrafluoromethane through plasma pyrolysis of waste PTFE, including the following steps:
  subjecting the waste PTFE to a plasma pyrolysis reaction to obtain a pyrolysis product, and
  subjecting the pyrolysis product to quenching and gas-solid separation in sequence to obtain a pyrolysis gas including the tetrafluoromethane;
  wherein the plasma pyrolysis reaction is performed at a temperature of 1,800 K to 5,000 K.

In some embodiments, the plasma pyrolysis reaction is conducted in a plasma reactor; and
  the plasma reactor includes one selected from the group consisting of a radio frequency plasma reactor, a microwave plasma reactor, and an arc plasma reactor.

In some embodiments, the waste PTFE is introduced into the plasma reactor through a carrier gas.

In some embodiments, the waste PTFE is in a form of a granular material.

In some embodiments, the carrier gas includes at least one selected from the group consisting of argon and nitrogen.

In some embodiments, a feed rate of the waste PTFE is in a range of 0.5 kg/h to 3,000 kg/h.

In some embodiments, the quenching is performed by surface-type heat-exchange quenching, direct quenching, or surface-type heat-exchange quenching and direct quenching.

In some embodiments, a cooling medium adopted for the surface-type heat-exchange quenching is at least one selected from the group consisting of water and a refrigerating fluid; and
  a cooling medium adopted for the direct quenching is at least one selected from the group consisting of argon and nitrogen.

In some embodiments, after the pyrolysis gas is obtained, the method further includes:
  subjecting the pyrolysis gas to adsorption and rectification to obtain a pure tetrafluoromethane product.

In some embodiments, the pyrolysis gas further includes hexafluoroethane and tetrafluoroethylene; and
  a total volume content of the tetrafluoromethane, the hexafluoroethane, and the tetrafluoroethylene in the pyrolysis gas is higher than or equal to 90%, with a highest volume content of the tetrafluoromethane in the pyrolysis gas.

The present disclosure provides a method for producing tetrafluoromethane through plasma pyrolysis of waste PTFE, including the following steps: subjecting the waste PTFE to a plasma pyrolysis reaction to obtain a pyrolysis product, and subjecting the pyrolysis product to quenching and gas-solid separation in sequence to obtain a pyrolysis gas including the tetrafluoromethane; wherein the plasma pyrolysis reaction is performed at a temperature of 1,800 K to 5,000 K. The present disclosure adopts a plasma technology for the pyrolysis of waste PTFE. The plasma heating has a higher thermal efficiency than the conventional pyrolysis mode. In coordination with the temperature of the pyrolysis reaction, the plasma heating allows high tetrafluoromethane selectivity, and leads to a pyrolysis gas product with tetrafluoromethane as a main component and small amounts of hexafluoroethane and tetrafluoroethylene. The relatively-simple product composition reduces the investment cost of the subsequent separation process, and is suitable for industrial scale-up. In addition, after adsorption and rectification, the pyrolysis gas can be returned to a device and used as a carrier gas for participating in the feeding and pyrolysis of waste PTFE, which can improve the utilization rate of a carrier gas and product yield. The present disclosure avoids the generation of highly-toxic octafluoroisobutene to a great extent. In the separation and purification method adopted, there is no need of the separate removal of octafluoroisobutene, and the octafluoroisobutene undergoes a pyrolysis reaction to produce tetrafluoromethane and will not be accumulated, which improves the yield of tetrafluoromethane. In the present disclosure, only a small amount of tetrafluoroethylene is produced, and the generation of autopolymers is avoided, such that a reactor and a material pipeline will not be blocked and the safety of production can be improved.

Some embodiments of the present disclosure also have the following advantages:

The method results in a high conversion rate for waste PTFE, and has a short reaction time, a large raw material treatment capacity, and a low energy consumption.

The method allows the resource utilization of one or more selected from the group consisting of a waste PTFE product, an unqualified product of a PTFE production process, and a leftover material.

In the method, no catalyst is required, which avoids device blockage caused by easily coking, deactivating, and carbonizing of a catalyst at high temperature.

DETAILED DESCRIPTION OF THE EMBODIMENTS

Figure 1:
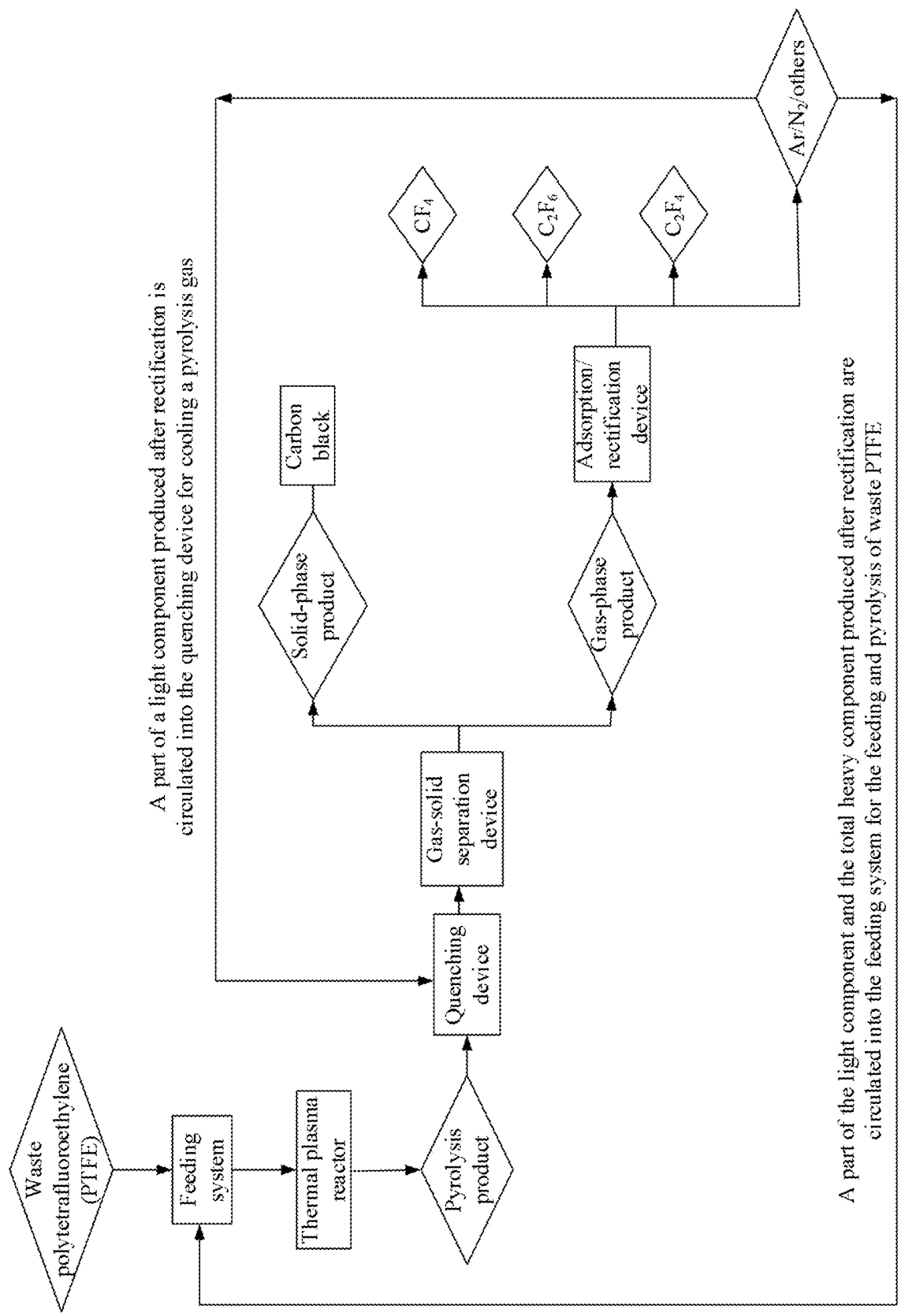
FIG. 1 is a flow chart of the method for producing tetrafluoromethane through plasma pyrolysis of waste PTFE according to an embodiment of the present disclosure.

The present disclosure provides a method for producing tetrafluoromethane through plasma pyrolysis of waste PTFE, including the following steps:
the waste PTFE is subjected to a plasma pyrolysis reaction to obtain a pyrolysis product, and
the pyrolysis product is subjected to quenching and gas-solid separation in sequence to obtain a pyrolysis gas including the tetrafluoromethane;
wherein the plasma pyrolysis reaction is performed at a temperature of 1,800 K to 5,000 K.

In the present disclosure, the waste PTFE is subjected to a plasma pyrolysis reaction to obtain a pyrolysis product.

In some embodiments of the present disclosure, the waste PTFE refers to a waste with PTFE as a main component. The present disclosure does not have special requirements for a source of the waste PTFE, and the waste PTFE can be one or more selected from the group consisting of a waste PTFE product, an unqualified product of a PTFE production process, and a leftover material. In some embodiments of the present disclosure, the waste PTFE includes or does not include a filler.

In some embodiments of the present disclosure, the plasma pyrolysis reaction is conducted in a plasma reactor.

In some embodiments of the present disclosure, the waste PTFE is introduced into the plasma reactor through a carrier gas; and the waste PTFE is in a form of a granular material. The present disclosure does not have special requirements for a size of waste PTFE particles, as long as the smooth feeding can be allowed.

In some embodiments of the present disclosure, a feed rate of the waste PTFE is in a range of 0.5 kg/h to 3,000 kg/h. Some embodiments of the present disclosure select an appropriate plasma reactor according to the feed rate of the waste PTFE and the temperature required for the plasma pyrolysis reaction. When the feed rate of the waste PTFE is high, a corresponding treatment capacity increases.

In some embodiments of the present disclosure, the carrier gas includes at least one selected from the group consisting of argon and nitrogen. When the carrier gas includes both argon and nitrogen, the present disclosure has no special requirements for a ratio of the argon to the nitrogen, and any ratio may be adopted. The present disclosure does not have special requirements for a flow rate of the carrier gas, as long as the fluidization of the waste PTFE can be allowed.

In some embodiments of the present disclosure, the plasma reactor includes one selected from the group consisting of a radio frequency plasma reactor, a microwave plasma reactor, and an arc plasma reactor. In some embodiments of the present disclosure, the arc plasma reactor is a direct current arc plasma reactor, and preferably a magnetically rotating arc thermal plasma reactor. The magnetically rotating arc thermal plasma reactor has advantages such as high mass and heat transfer efficiencies and uniform and easily-controllable residence time.

In some embodiments of the present disclosure, the plasma pyrolysis reaction is performed at the temperature of 1,800 K to 5,000 K, preferably 2,000 K to 4,500 K, further more preferably 2,500 K to 4,000 K, and most preferably 3,000 K to 3,500 K.

In some embodiments of the present disclosure, the temperature of the plasma pyrolysis reaction is controlled in the above-mentioned range to ensure that the pyrolysis product includes a solid-phase product and a pyrolysis gas; and the pyrolysis gas includes tetrafluoromethane as a main component. In some embodiments of the present disclosure, the pyrolysis gas further includes hexafluoroethane and tetrafluoroethylene, and a total volume content of the tetrafluoromethane, the hexafluoroethane, and the tetrafluoroethylene in the pyrolysis gas is higher than or equal to 90%, with a highest volume content of the tetrafluoromethane in the pyrolysis gas. In some embodiments of the present disclosure, the pyrolysis gas inevitably further includes a large amount of the carrier gas (when direct quenching is adopted, the pyrolysis gas further includes a direct quenching medium), and the above volume contents are calculated on the basis of a gas product produced after a simple pyrolysis reaction (the carrier gas and the direct quenching medium are not gas products of the pyrolysis reaction).

The pyrolysis gas of the present disclosure has a simple composition, and the relatively-simple composition reduces the investment cost of the subsequent separation process and is suitable for industrial scale-up. In addition, only a small amount of tetrafluoroethylene is produced, and the generation of autopolymers is avoided, such that a reactor and a material pipeline will not be blocked and the safety of production can be improved.

In some embodiments of the present disclosure, the solid-phase product is mainly a carbon material. In some embodiments of the present disclosure, a mass content of carbon black in the solid-phase product is higher than or equal to 90%, and the remaining component in the solid-phase product is mainly an inorganic component such as graphene or other heavy metals (if the waste PTFE includes heavy metals, the solid-phase product will include a heavy metal component).

In some embodiments of the present disclosure, the plasma pyrolysis reaction is performed by a millisecond pyrolysis reaction, and after the plasma pyrolysis reaction, under a pushing action of a flow of the carrier gas, the pyrolysis product automatically enters a quenching device.

In some embodiments of the present disclosure, the quenching is performed by surface-type heat-exchange quenching, direct quenching, or surface-type heat-exchange quenching and direct quenching. In some embodiments of the present disclosure, a cooling medium adopted for the surface-type heat-exchange quenching is at least one selected from the group consisting of water and a refrigerating fluid. The present disclosure does not have special requirements for a specific type of the refrigerating fluid, and a refrigerating fluid with a cooling function that is well known in the art may be adopted, specifically such as ethylene glycol. In some embodiments of the present disclosure, a cooling medium adopted for the direct quenching is at least one selected from the group consisting argon and nitrogen.

The present disclosure adopts the quenching to ensure the implementation of the subsequent gas-solid separation. Since the existing gas-solid separation device cannot tolerate the temperature of the pyrolysis product, it is necessary to quench the pyrolysis product.

The present disclosure does not have special requirements for a temperature of a quenched pyrolysis product, as long as the subsequent gas-solid separation can withstand the temperature.

The present disclosure does not have special requirements for a manner of the gas-solid separation, and a gas-solid separation manner well known in the art may be adopted, specifically such as cyclone separator separation. In some embodiments of the present disclosure, the gas-solid separation is performed by two-stage gas-solid separation, wherein a first-stage separation device is a cyclone separator configured to capture large carbon black particles or aggregates of small carbon black particles, and a second-stage separation device is a filter configured to capture small carbon black particles.

In the present disclosure, after the gas-solid separation, a solid-phase product and a pyrolysis gas including tetrafluoromethane are obtained. The compositions of the solid-phase product and the pyrolysis gas have been discussed above and will not be repeated here.

In some embodiments of the present disclosure, after the pyrolysis gas is obtained, the method further includes: the pyrolysis gas is subjected to adsorption and rectification to obtain a pure tetrafluoromethane product. In some embodiments of the present disclosure, the adsorption and rectification are conducted to separate tetrafluoromethane, hexafluoroethane, and tetrafluoroethylene. The present disclosure does not have special requirements for conditions of the adsorption and rectification, and conditions well known in the art that can separate tetrafluoromethane, hexafluoroethane, and tetrafluoroethylene may be adopted. In some embodiments of the present disclosure, in addition to the pure tetrafluoromethane product, a pure hexafluoroethane product and a pure tetrafluoroethylene product are obtained.

In some embodiments of the present disclosure, a light component produced after the rectification of the pyrolysis gas includes the carrier gas and the direct quenching medium and is divided into two parts, wherein one part is used to feed the waste PTFE into a thermal plasma reactor for pyrolysis, the other part is used as a direct quenching medium for quenching the pyrolysis gas; and a ratio of the two parts meets the flow rate requirements of the carrier gas and the direct quenching medium. In some embodiments of the present disclosure, a heavy component produced after the rectification includes other by-products and is used to feed the waste PTFE into the thermal plasma reactor for pyrolysis.

FIG. 1 is a flow chart of the method for producing tetrafluoromethane through plasma pyrolysis of waste PTFE in an embodiment of the present disclosure. As shown in FIG. 1, in an embodiment of the present disclosure: Waste PTFE is introduced into a plasma reactor through a feeding system and subjected to a pyrolysis reaction to obtain a pyrolysis product, and the pyrolysis product is subjected to quenching and gas-solid separation in sequence to obtain a solid-phase product and a gas-phase product (namely, a pyrolysis gas including tetrafluoromethane, hexafluoroethane, and tetrafluoroethylene). A part of the gas-phase product is subjected to adsorption and rectification to obtain pure tetrafluoromethane, hexafluoroethane, and tetrafluoroethylene products; and another part of the gas-phase product is circulated to the feeding system as a part of carrier gas for preheating and fluidization of waste PTFE particles. A part of a light component (mainly at least one selected from the group consisting of argon and nitrogen) produced after the rectification is circulated into a quenching device for direct quenching and cooling the pyrolysis gas (when surface-type heat-exchange quenching is adopted, the light component can be totally circulated as a carrier gas into the feeding system). The remaining light component (mainly at least one selected from the group consisting of argon and nitrogen) and total heavy components are circulated into the feeding system for the feeding and pyrolysis of waste PTFE.

The method for producing tetrafluoromethane through plasma pyrolysis of waste PTFE provided by the present disclosure is described in detail below with reference to examples, but these examples may not be understood as a limitation to the scope of the present disclosure.

Example 1

Figure 2:
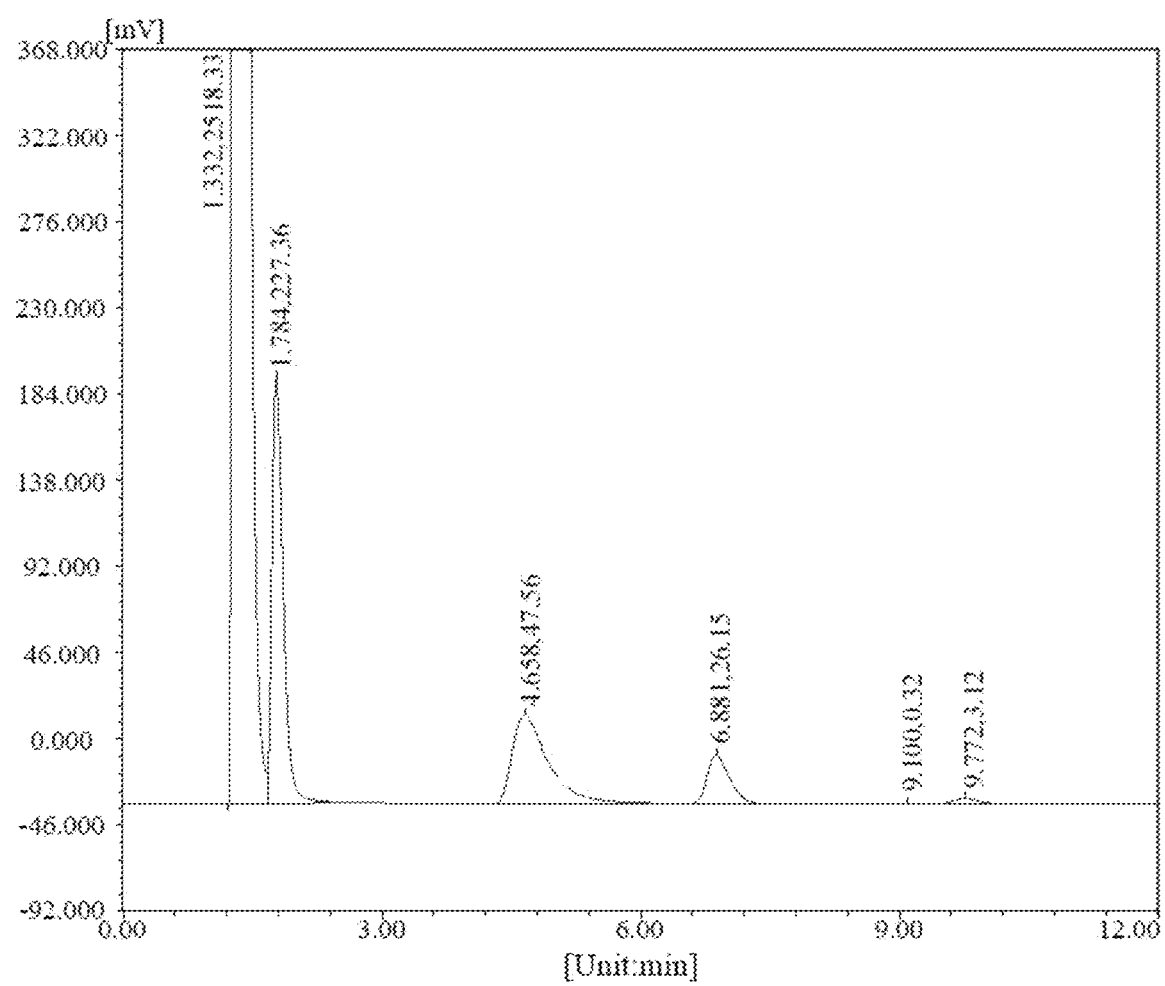
FIG. 2 is a gas chromatogram of the pyrolysis gas in Example 1.

Waste PTFE was fluidized with argon and fed into a microwave plasma reactor through a feeding system. A flow rate of the waste PTFE was 2.4 kg/h, a flow rate of the argon was 2 Nm³/h, and a temperature in the microwave plasma reactor was 2,000 K. A resulting system was subjected to a millisecond pyrolysis reaction to obtain a pyrolysis product, and the pyrolysis product was introduced into a cooling device and cooled to 300 K through surface-type heat exchange with water as a cooling medium, and then a resulting cooled product was subjected to gas-solid separation to obtain a pyrolysis gas and a solid-phase product. The pyrolysis gas was sampled and subjected to gas chromatography analysis (as shown in FIG. 2, an x-coordinate in FIG. 2 represents a time in a unit of min). Then the pyrolysis gas was subjected to adsorption and rectification to obtain high-purity tetrafluoromethane, hexafluoroethane, and tetrafluoroethylene. A light component (mainly argon) and total heavy components produced after the rectification were used to feed the waste PTFE into a thermal plasma reactor for pyrolysis.

Figure 3:
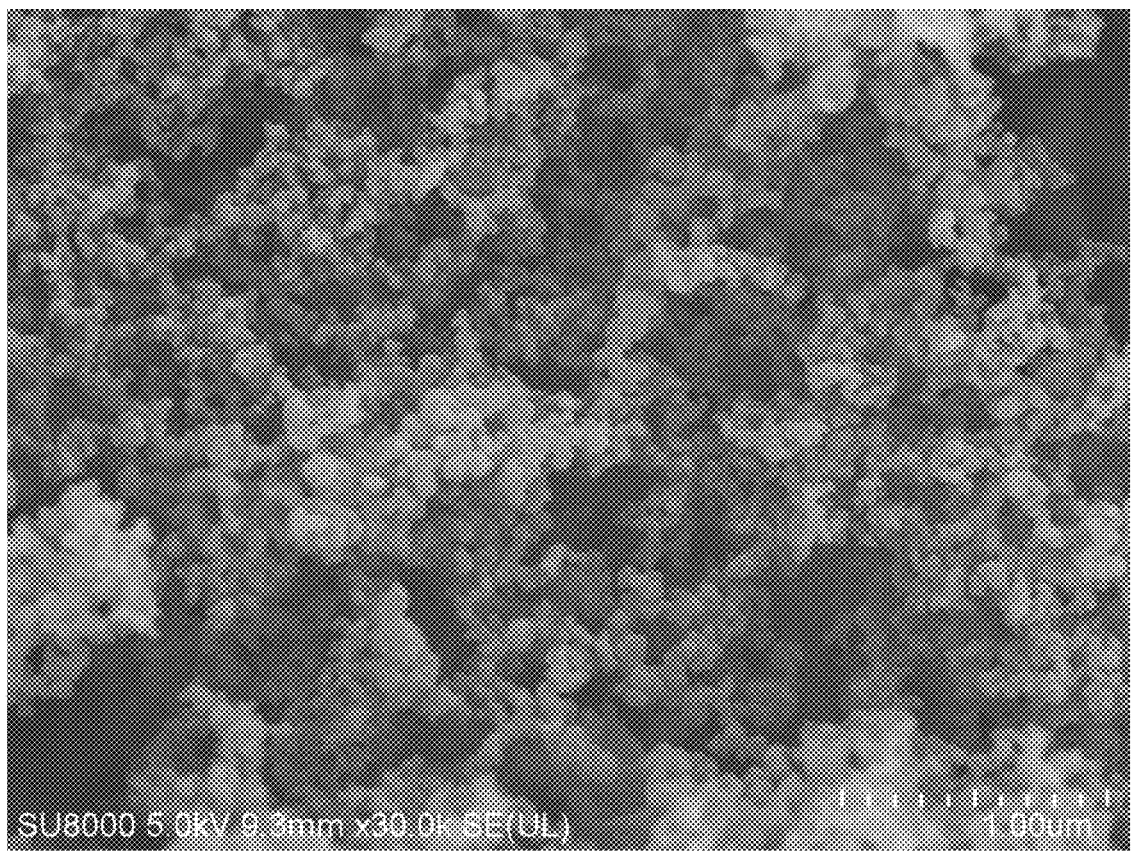
FIG. 3 is a scanning electron microscopy (SEM) image of the solid product in Example 1.

According to gas chromatography detection and analytical calculation results, in the pyrolysis gas, a volume content of tetrafluoromethane is 66.78%, a volume content of hexafluoroethane is 26.82%, and a volume content of tetrafluoroethylene is 6.39%. FIG. 3 is an SEM image of the solid-phase product in Example 1. It can be seen from FIG. 3 that the solid-phase product is mainly carbon black nanoparticles.

Example 2

Figure 4:
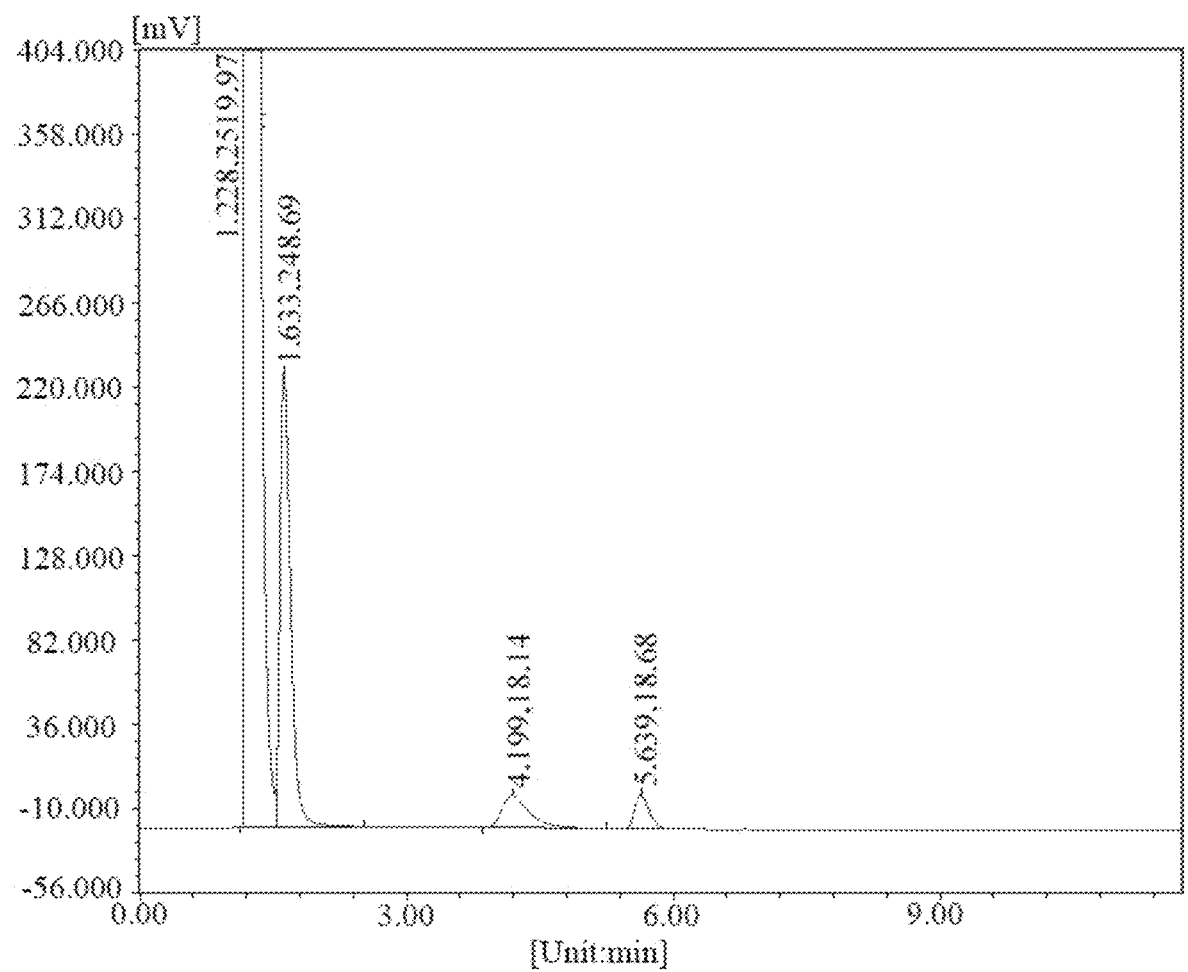
FIG. 4 is a gas chromatogram of the pyrolysis gas in Example 2.

Waste PTFE was crushed, and then fluidized with argon and fed into a radio frequency plasma reactor through a feeding system. A flow rate of the waste PTFE was 5 kg/h, a flow rate of the argon was 4 Nm³/h, and a temperature in the radio frequency plasma reactor was 3,200 K. A resulting system was subjected to a millisecond pyrolysis reaction to obtain a pyrolysis product, and the pyrolysis product was introduced into a cooling device and cooled to 520 K through surface-type heat exchange with water as a cooling medium, and then a resulting cooled product was subjected to gas-solid separation to obtain a solid-phase product and a pyrolysis gas. The pyrolysis gas was sampled and subjected to gas chromatography analysis (as shown in FIG. 4, an x-coordinate in FIG. 4 represents a time in a unit of min). Then the pyrolysis gas was subjected to adsorption and rectification to obtain high-purity tetrafluoromethane, hexafluoroethane, and tetrafluoroethylene. A light component (mainly argon) and total heavy components produced after the rectification were used to feed the waste PTFE into a thermal plasma reactor for pyrolysis.

Figure 5:
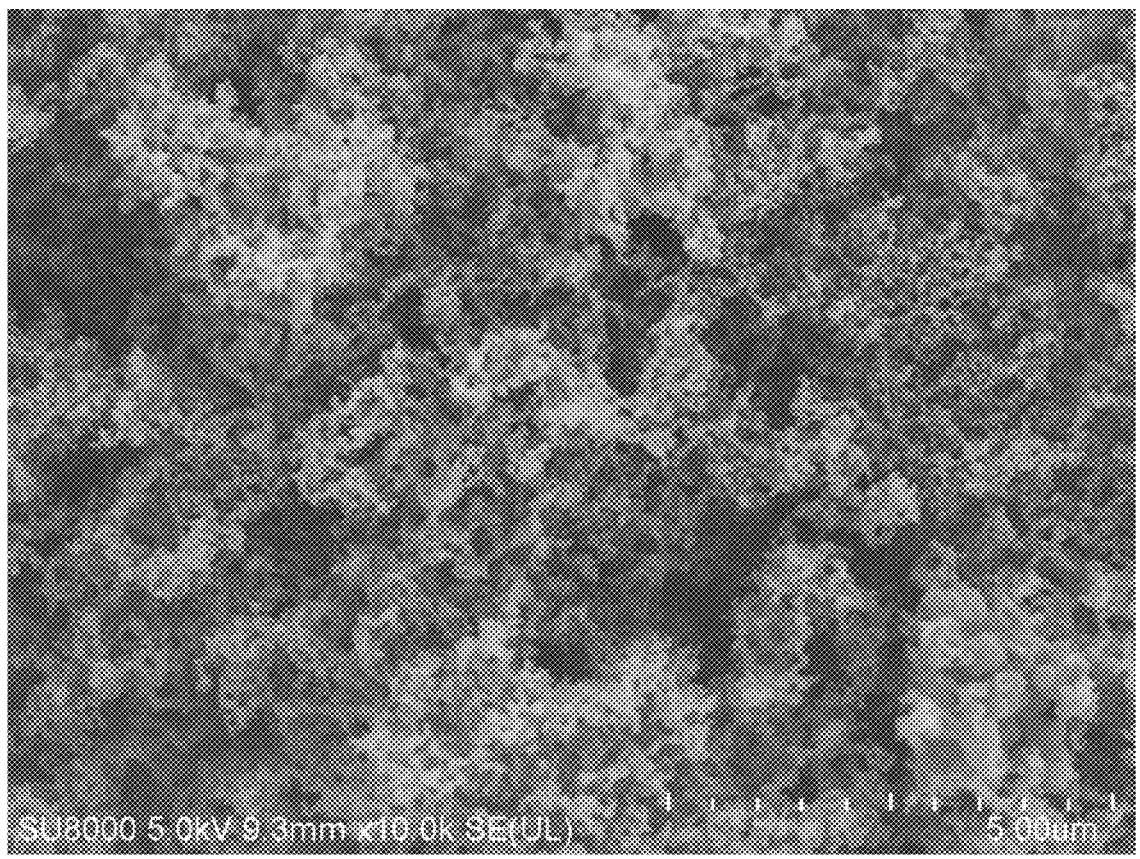
FIG. 5 is an SEM image of the solid product in Example 2.

According to gas chromatography detection and analytical calculation results, in the pyrolysis gas, a volume content of tetrafluoromethane is 83.24%, a volume content of hexafluoroethane is 12.08%, and a volume content of tetrafluoroethylene is 2.13%. FIG. 5 is an SEM image of the solid-phase product in Example 2. It can be seen from FIG. 5 that the solid-phase product is mainly carbon black nanoparticles and includes a small amount of a graphene lamellar structure.

Example 3

Figure 6:
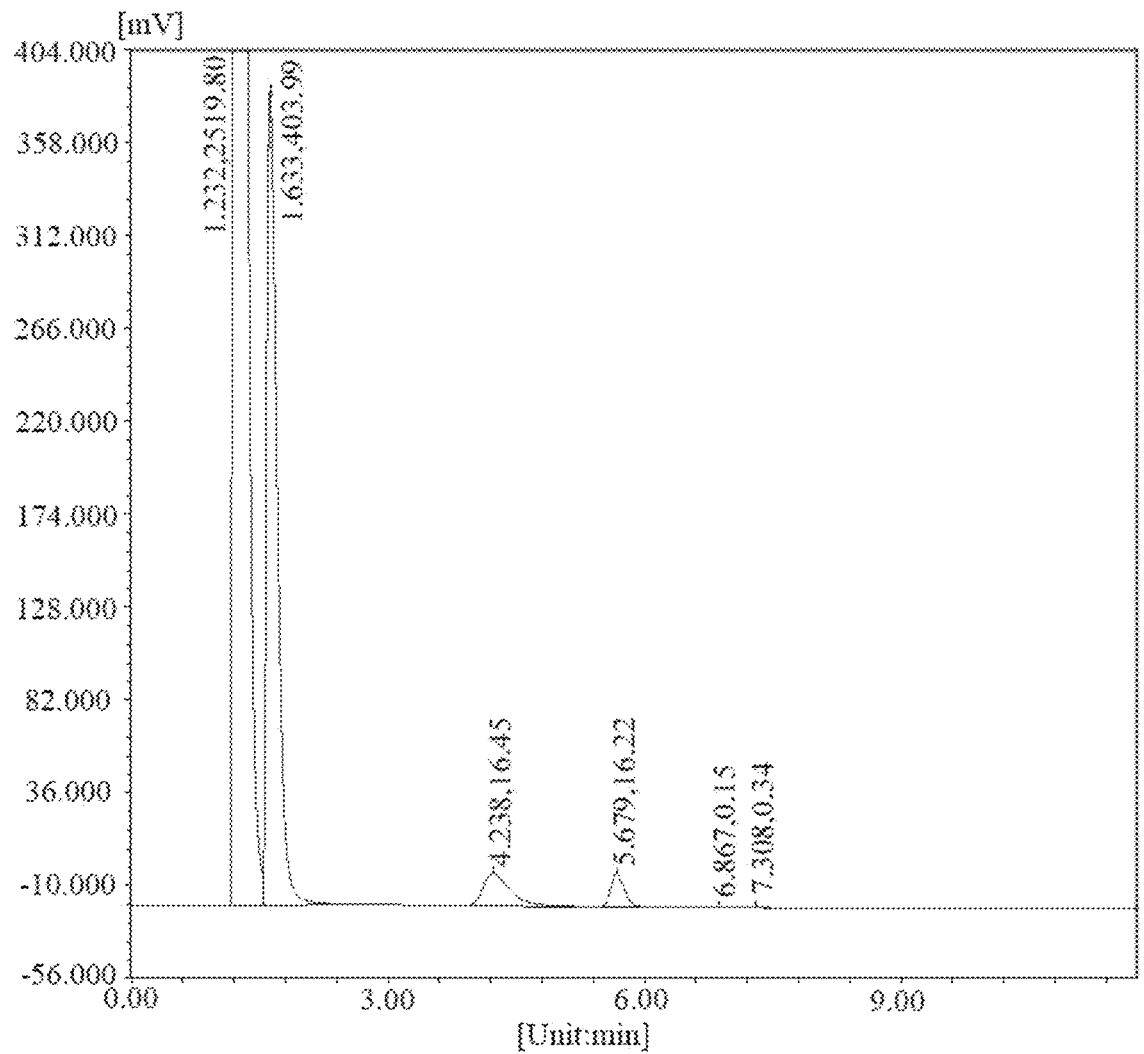
FIG. 6 is a gas chromatogram of the pyrolysis gas in Example 3.

Waste PTFE was crushed, and then fed with argon into a direct current arc plasma reactor through a feeding system. A flow rate of the waste PTFE was 10 kg/h, a flow rate of the argon was 7.2 Nm³/h, and a temperature in the direct current arc plasma reactor was 4,400 K. A resulting system was subjected to a millisecond pyrolysis reaction to obtain a pyrolysis product, and the pyrolysis product was introduced into a cooling device and cooled to 980 K through surface-type heat exchange with water as a cooling medium, and then a resulting cooled product was subjected to gas-solid separation to obtain a solid-phase product and a pyrolysis gas. The pyrolysis gas was divided into two parts, wherein one part was used together with argon as a carrier gas for preheating and fluidizing the waste PTFE, and the other part was sampled and subjected to gas chromatography analysis (as shown in FIG. 6, an x-coordinate in FIG. 6 represents a time in a unit of min) and then was subjected to adsorption and rectification to obtain high-purity tetrafluoromethane, hexafluoroethane, and tetrafluoroethylene. A light component (mainly argon) and total heavy components produced after the rectification were used to feed the waste PTFE into a thermal plasma reactor for pyrolysis.

Figure 7:
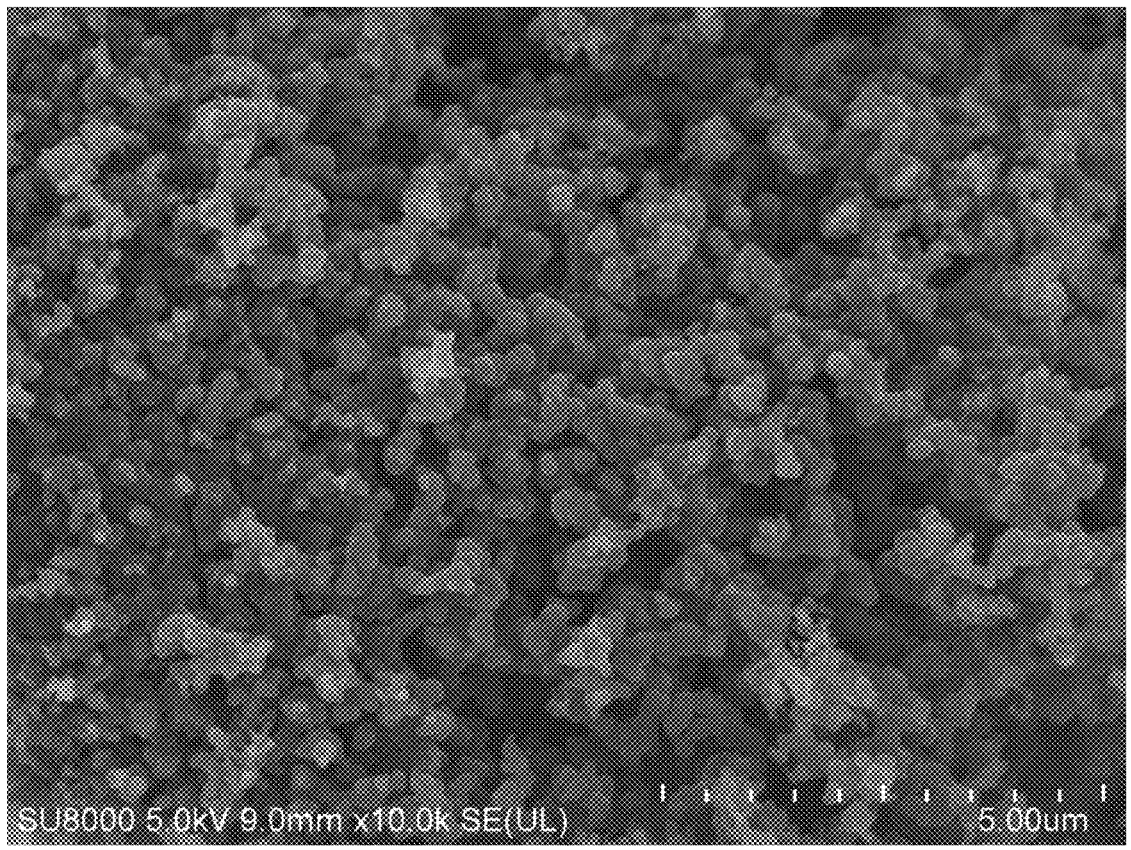
FIG. 7 is an SEM image of the solid product in Example 3.

According to gas chromatography detection and analytical calculation results, in the pyrolysis gas, a volume content of tetrafluoromethane is 90.17%, a volume content of hexafluoroethane is 6.08%, and a volume content of tetrafluoroethylene is 0.93%. FIG. 7 is an SEM image of the solid-phase product in Example 13. It can be seen from FIG. 7 that the solid-phase product is mainly carbon black nanoparticles.

Comparative Example 1

Figure 8:
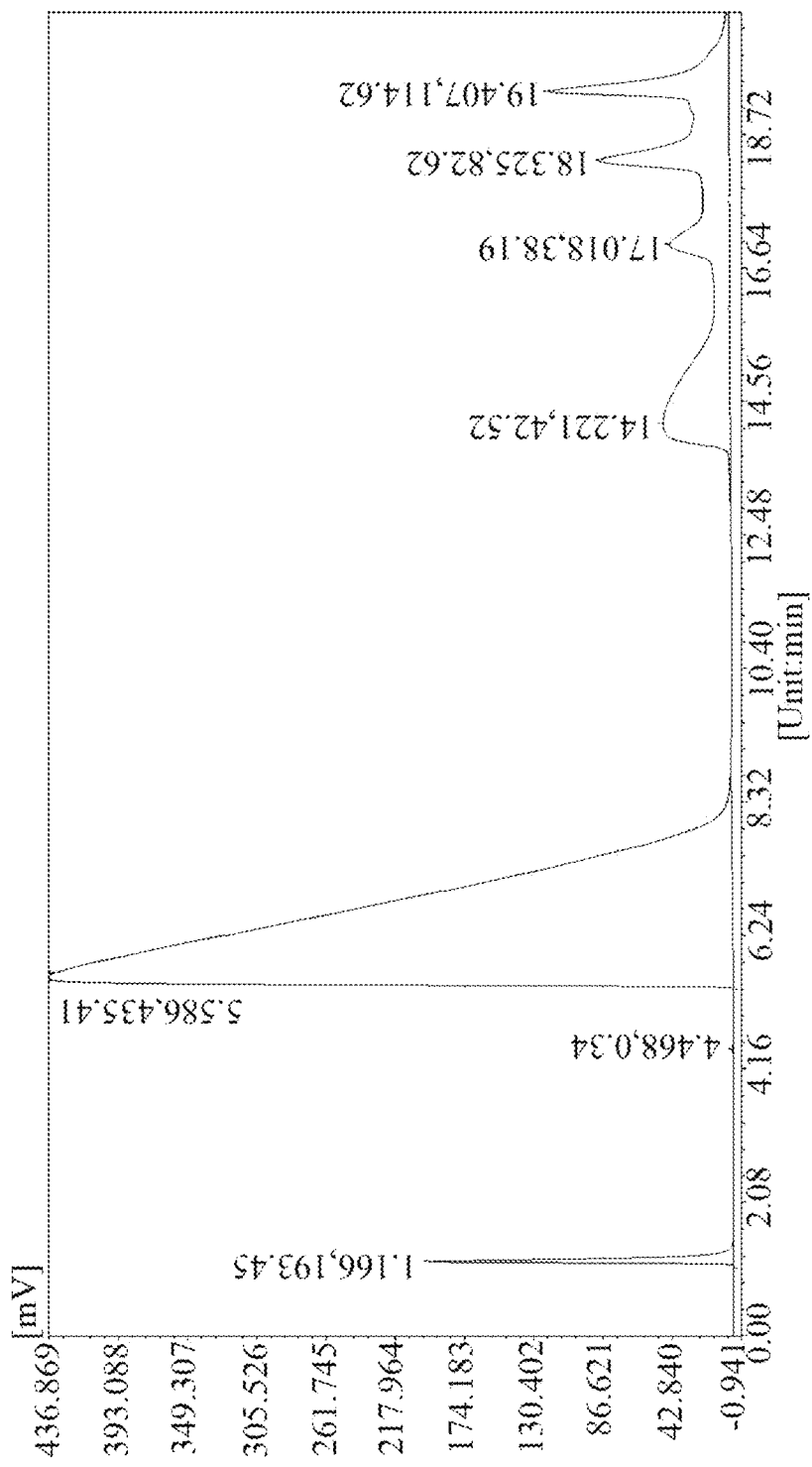
FIG. 8 is a gas chromatogram of the pyrolysis gas in Comparative Example 1.

Waste PTFE was crushed, and then fed with nitrogen into a fluidized bed reactor through a feeding system. A flow rate of the waste PTFE was 85 g/h, a flow rate of the nitrogen was 0.7 Nm³/h, and in the fluidized bed reactor, a temperature was 650° C. to 800° C. and a residence time was 3 s. A resulting pyrolysis gas was detected by gas chromatography (as shown in FIG. 8, an x-coordinate in FIG. 8 represents a time in a unit of min). A mass fraction of recovered substances is 81.9%, wherein tetrafluoroethylene accounts for 72%, hexafluoropropylene accounts for 4.1%, octafluorocyclobutane accounts for 5.8%, the remaining by-products accounts for 13.1%, and no tetrafluoromethane was detected.

It can be seen from the examples and the comparative example that the present disclosure adopts a plasma technology for the pyrolysis of waste PTFE and controls the temperature of the pyrolysis, and compared with the conventional pyrolysis method, the present disclosure allows a simple composition of a pyrolysis product and high tetrafluoromethane selectivity. It can also be seen from the examples and the comparative example that the use of plasma to treat PTFE in the present disclosure also has advantages such as a large treatment capacity and a short residence time compared with the conventional pyrolysis method.

The above are merely preferred embodiments of the present disclosure. It should be noted that a person of ordinary skill in the art may further make several improvements and modifications without departing from the principle of the present disclosure, but such improvements and modifications should be deemed as falling within the scope of the present disclosure.

What is claimed is:

1. A method for producing tetrafluoromethane through plasma pyrolysis of waste polytetrafluoroethylene (PTFE), comprising the following steps:
   subjecting the waste PTFE to a plasma pyrolysis reaction to obtain a pyrolysis product,
   subjecting the pyrolysis product to quenching and gas-solid separation in sequence to obtain a pyrolysis gas comprising the tetrafluoromethane; and
   subjecting the pyrolysis gas to adsorption and rectification to obtain the tetrafluoromethane;
   wherein, the plasma pyrolysis reaction is performed at a temperature of 2,000 K to 4,500 K;
   wherein, the plasma pyrolysis reaction is conducted in a plasma reactor;
   wherein, the plasma reactor is selected from the group consisting of a radio frequency plasma reactor, a microwave plasma reactor, and an arc plasma reactor;
   wherein, the waste PTFE is introduced into the plasma reactor through a carrier gas; and
   wherein, the waste PTFE is in a form of a granular material.

2. The method according to claim 1, wherein the carrier gas comprises at least one selected from the group consisting of argon and nitrogen.

3. The method according to claim 1, wherein a feed rate of the waste PTFE is in a range of 0.5 kg/h to 3,000 kg/h.

4. The method according to claim 1, wherein the quenching is performed by surface-type heat-exchange quenching, direct quenching, or surface-type heat-exchange quenching and direct quenching.

5. The method according to claim 4, wherein a cooling medium adopted for the surface-type heat-exchange quenching is at least one selected from the group consisting of water and a refrigerating fluid; and
   a cooling medium adopted for the direct quenching is at least one selected from the group consisting of argon and nitrogen.

6. The method according to claim 1, wherein the pyrolysis gas further comprises hexafluoroethane and tetrafluoroethylene; and
   a total volume content of the tetrafluoromethane, the hexafluoroethane, and the tetrafluoroethylene in the pyrolysis gas is higher than or equal to 90%, with tetrafluoromethane being the largest volume in the pyrolysis gas.

7. The method according to claim 6, wherein a volume content of the hexafluoroethane is higher than that of the tetrafluoroethylene.

8. The method according to claim 1, wherein the plasma pyrolysis reaction is a millisecond pyrolysis reaction.

* * * * *